US011635490B2

(12) United States Patent
Vogel et al.

(10) Patent No.: US 11,635,490 B2
(45) Date of Patent: Apr. 25, 2023

(54) SURVEYING SYSTEM HAVING A ROTATING MIRROR

(71) Applicant: Trimble Jena GmbH, Jena (DE)

(72) Inventors: Michael Vogel, Schleifreisen (DE); Gregory Lepere, Superior, CO (US)

(73) Assignee: Trimble Jena GmbH, Jena (DE)

( * ) Notice: Subject to any disclaimer, the term of this patent is extended or adjusted under 35 U.S.C. 154(b) by 735 days.

(21) Appl. No.: 16/601,432

(22) Filed: Oct. 14, 2019

(65) Prior Publication Data

US 2020/0264282 A1 Aug. 20, 2020

(30) Foreign Application Priority Data

Feb. 15, 2019 (EP) .................................... 19157555

(51) Int. Cl.
  *G01S 7/48* (2006.01)
  *G01S 7/481* (2006.01)
  *G01S 17/86* (2020.01)
  *G01S 17/89* (2020.01)
(52) U.S. Cl.
  CPC ............ *G01S 7/4813* (2013.01); *G01S 17/86* (2020.01); *G01S 17/89* (2013.01)

(58) Field of Classification Search
  CPC ......... G01S 7/4813; G01S 17/86; G01S 17/89
  See application file for complete search history.

(56) References Cited

U.S. PATENT DOCUMENTS

| 2017/0168141 | A1* | 6/2017 | Yuasa ...................... G01S 17/42 |
| 2019/0304109 | A1* | 10/2019 | Wohlfeld ................ G01S 17/87 |
| 2020/0333463 | A1* | 10/2020 | Sugihara ............... G01S 7/4817 |

* cited by examiner

*Primary Examiner* — Girumsew Wendmagegn
(74) *Attorney, Agent, or Firm* — Kilpatrick Townsend & Stockton LLP

(57) ABSTRACT

A surveying system comprises a controller; a support; a mounting structure mounted on the support, wherein the mounting structure is rotatable about a first axis relative to the support; a first motor to rotate the mounting structure relative to the support; a first mirror mounted on the mounting structure, wherein the first mirror is rotatable relative to the mounting structure about a second axis, wherein the second axis substantially coincides with the first axis; a second motor to rotate the first mirror relative to the mounting structure; and a first light source configured to direct a light beam onto the first mirror.

20 Claims, 1 Drawing Sheet

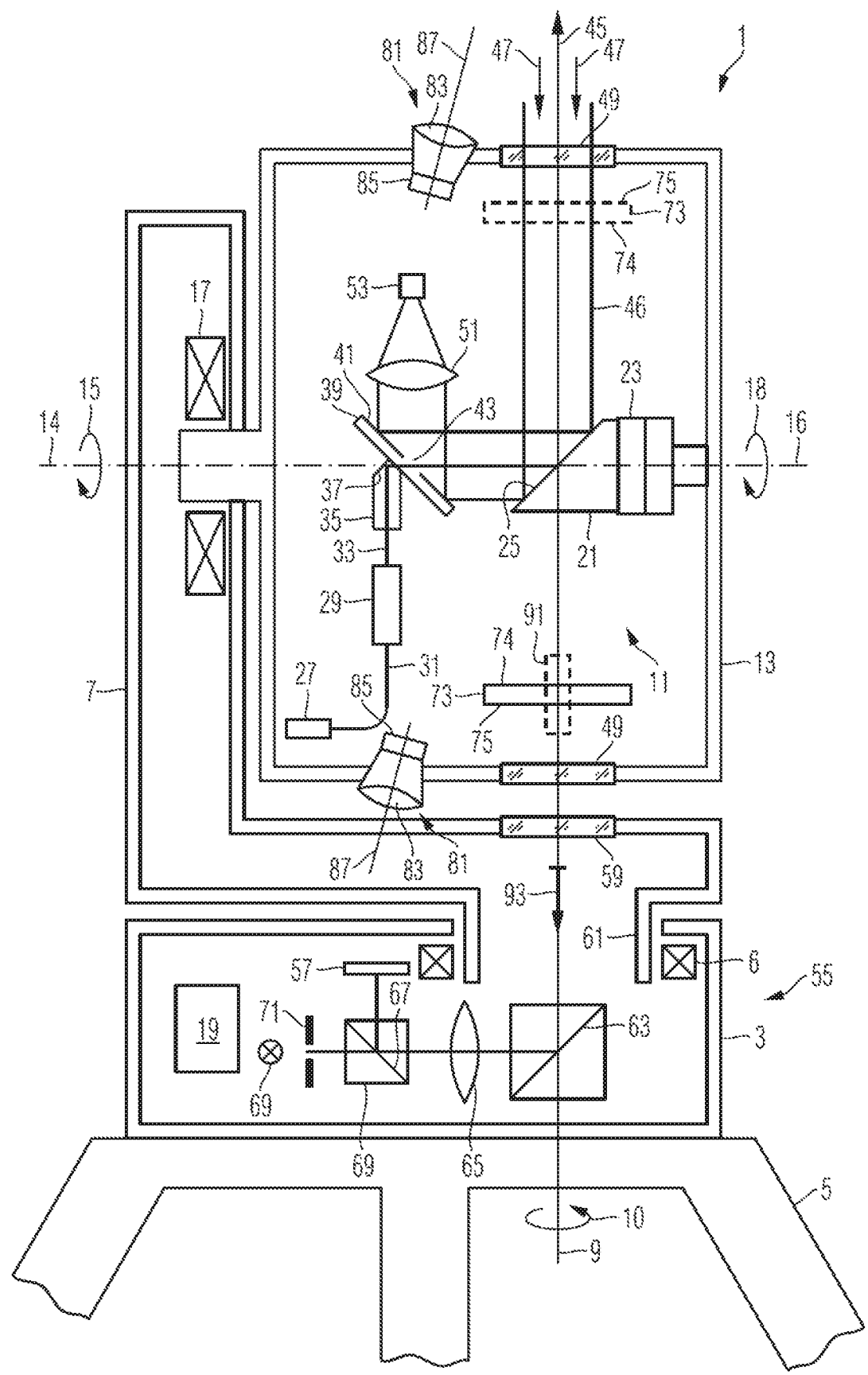

SURVEYING SYSTEM HAVING A ROTATING MIRROR

CROSS-REFERENCE TO RELATED APPLICATIONS

The present application claims priority to EP Application No. 19 157 555.4, filed Feb. 15, 2019, the contents of which are incorporated herein by reference in their entirety for all purposes.

FIELD

The present invention relates to surveying systems having rotating mirrors.

BACKGROUND

A conventional surveying system comprises a measuring unit generating a beam of measuring light which can be directed to a point on an object. The object reflects or scatters the incident measuring light such that the measuring unit receives some of the light back from the object. The measuring unit may then determine the distance of the object from the measuring unit based on a time of flight analysis, for example.

The surveying system further comprises a rotating mirror, wherein the measuring unit directs the generated beam of measuring light onto the rotating mirror from which the beam is reflected to positions on the object depending on the rotational position of the mirror. The mirror can be driven at high speeds so that the beam is scanned across objects located around the surveying system in order to perform a high number of distance measurements or other measurements.

Moreover, since the rotation of the rotating mirror is a controlled rotation, the direction of the beam of measuring light emitted from the surveying system is known at each instance of time. When the position and orientation of the surveying system is known in a given coordinate system, it is possible to associate the measuring results with coordinates in the coordinate system. It is in particular possible to determine the coordinates of the points where the light beam is incident on the objects around the surveying system in this coordinate system.

It is apparent that the accuracy of these determinations depends on the accuracy of the information relating to the direction at which the beam of measuring light is emitted from the surveying system at the time when the measurement is made.

SUMMARY

Accordingly, it is an object of the present invention to provide a surveying system having a rotating mirror providing improved information relating to the directions of the emitted beam of measuring light at various rotational positions of the rotating mirror. Moreover, it is an object of the present invention to expand the usability of a surveying system having a rotating mirror.

According to embodiments of the present invention, a surveying system comprises a mounting structure for mounting various optical and electronic components of the surveying system. In particular, a first mirror is mounted on the mounting structure, wherein the first mirror is rotatable relative to the mounting structure about an axis. A motor is provided to rotate the mirror relative to the mounting structure. A first light source is configured to direct a light beam onto the first mirror.

According to some embodiments, the first light source is mounted on the mounting structure.

According to exemplary embodiments, the surveying system further comprises a support, wherein the mounting structure is mounted on the support to be rotatable about an axis. A motor is provided to rotate the mounting structure relative to the support.

According to some embodiments, the first light source is mounted on the support.

The axis of rotation of the first mirror relative to the mounting structure may substantially coincide with the axis of rotation of the mounting structure relative to the support. A direction of incidence of the light beam on the first mirror can be substantially parallel to one of the axis of rotation of the first mirror relative to the mounting structure and of the axis of rotation of the mounting structure relative to the support. An angle between the axis of rotation of the mirror and a surface normal of a mirror surface of the first mirror can be about 45 degrees.

The surveying system may further comprise a first detector configured to detect light having travelled a beam path extending from the first light source via the first mirror to an object and back from the object via the first mirror to the first detector. For example, the first light source may generate a pulse of light which is directed onto the rotating mirror and reflected towards an object. A corresponding pulse of light received back from the object is detected by the first detector, and the time difference between the emission of the light pulse and the receipt of the light from the object is indicative of the distance of the object from the surveying system. This procedure can be repeated for a plurality of rotational positions of the rotating mirror relative to the mounting structure so that distances of various objects arranged around the surveying system can be measured in a plane defined by the light beam reflected from the rotating mirror.

If the direction of incidence of the light beam onto the mirror exactly coincides with the axis of rotation of the mirror relative to the mounting structure and if the angle between the surface normal of the first mirror and the direction of the incident light beam is exactly 45 degrees, the light beam reflected from the mirror coincides with a plane orthogonal to the axis of rotation of the mirror about the mounting structure. In practice, this ideal situation is not fulfilled, however. For example, if the light beam directed onto the rotating mirror is parallel to the axis of rotation of the rotational mirror but arranged at a small distance from the axis of rotation, the light beam reflected from the rotating mirror is always parallel to the plane orthogonal to the axis of rotation of the rotating mirror but arranged at varying distances from that plane. The distance from the plane depends on the rotational position of the mirror. If the direction of incidence of the light beam onto the rotating mirror is oriented at a small angle relative to the axis of rotation of the rotating mirror, the light beam reflected from the rotating mirror follows a conical shape. Other deviations from the ideal case are possible and result in more complicated deviations of the emitted light beam from the plane orthogonal to the axis of rotation.

According to some embodiments, the surveying system comprises a second detector mounted on the support and configured to detect light having travelled a beam path extending from the first light source via the first mirror to the second detector.

The second detector has a small extension in the circumferential direction about the axis of rotation of the rotating mirror. The second detector receives light reflected from the rotating mirror within a small range of rotational positions of the rotating mirror, accordingly. When the rotating mirror is oriented within this small range of rotations, the second detector can determine a position at which the light beam reflected from the rotating mirror is incident on the second detector. This position is indicative of the angle between the direction of the light beam reflected from the rotating mirror and the axis of rotation of the rotating mirror. This angle represents important information for associating measurement results, such as distances, with coordinates in a coordinate system of the surveying system. However, this information is obtained at rotational positions of the rotating mirror where the beam of measuring light is incident on the second detector and not on objects to be measured and located around the surveying system. Now, the controller may actuate the first motor in order to rotate the mounting structure relative to the support by some amount and to repeat the measurement of the position of incidence of the beam reflected from the rotating mirror on the second detector. Again, this position is indicative only for a small angular range of rotational positions of the rotating mirror relative to the mounting structure, but this range of rotational positions is different from the range explored in the previous measurement. This procedure can be repeated for a sufficient number of rotational positions of the mounting structure relative to the support until a full circle is reached, resulting in plural measurements of the positions of incidence of the light beam reflected from the rotating mirror on the second detector for substantially all rotational positions of the rotating mirror about the axis of rotation of the rotating mirror relative to the mounting structure. It follows, that this method allows to determine the direction of the emission of the measuring light beam from the rotating mirror for all rotational positions of the rotating mirror about its axis of rotation.

According to further exemplary embodiments, the surveying system further comprises a base, wherein the support is mounted on the base to be rotatable about an axis oriented transverse to the axis of rotation of the mounting structure relative to the support. According to particular embodiments herein, the axis of rotation of the support relative to the base is oriented substantially orthogonal to the axis of rotation of the mounting structure relative to the support. According to further embodiments herein, the surveying system further comprises a third motor controlled by the controller and configured to rotate the support relative to the base.

According to further exemplary embodiments, the surveying system comprises a tripod, wherein the base is mounted on the tripod.

Using a tripod, the surveying system can be readily mounted at nearly any desired location, typically such that the axis of rotation of the support relative to the base is aligned with the gravity vector at the chosen location. The component of the surveying system providing the base is often referred to as an alidade in the art.

The surveying system can he operated such that the support is rotated about its axis of rotation relative to the base by 180 degrees at a low rotational speed. While performing this rotation, the rotating mirror is rotated about its axis of rotation relative to the mounting structure at a high speed, while distance measurements are continuously recorded. With such procedure, distances of substantially all objects positioned around the surveying system can be determined. However, if the axis of rotation of the rotating mirror relative to the mounting structure is not oriented orthogonal to the axis of rotation of the support relative to the base, it is not possible to direct beams of measuring light to objects located at positions located on the axis of rotation of the support relative to the base. Therefore, it is desirable to have the axis of rotation of the rotational mirror oriented exactly orthogonal to the axis of rotation of the support relative to the base, or, it is at least desirable to exactly know an amount of deviation of this angle from 90 degrees.

According to some exemplary embodiments, the surveying system further comprises a third detector mounted on the base and configured to detect light having travelled a beam path extending from the first light source via the first mirror to the third detector. This third detector may have a function as illustrated above with respect to the second detector mounted on the support.

According to further exemplary embodiments, the surveying system further comprises a second mirror mounted on the mounting structure, a second light source mounted on the base and configured to direct a light beam onto the second mirror when the mounting structure is arranged in a first rotational position about the axis of rotation of the mounting structure relative to the support, and when the mounting structure is in a second rotational position about this axis of rotation. A third detector is mounted on the base and configured to detect light having travelled a beam path extending from the second light source via the second mirror to the third detector. The first and second rotational positions of the mounting structure relative to the support may differ by more than 20 degrees or more than 40 degrees. According to particular embodiments, these two rotational positions differ by substantially 180 degrees. Using such system, it is possible to perform a set of measurements in which the mounting structure is in the first and second rotational positions, and wherein the support is in plural different positions about the axis of rotation of the support relative to the base. In each measurement, the location of incidence of the light emitted from the second light source and received by the detector via the second mirror is recorded.

Based on such measurements, it is possible to determine the angle between the axis of rotation of the support relative to the base and the axis of rotation of the mounting structure relative to the support. Moreover, it is possible to determine the angle between the axis of rotation of the rotating mirror relative to the mounting structure and the axis of rotation of the mounting structure relative to the support as illustrated above. It is apparent that such procedure allows to exactly determine the direction of the beam of measuring light reflected from the rotating mirror for all rotational positions of the rotating mirror about its axis of rotation and for all rotational positions of the support relative to the base. Therefore, it is possible to calibrate the surveying system with respect to the angles between its rotational axes without using external measuring tools.

According to further exemplary embodiments, the surveying system comprises at least one camera mounted on the mounting structure, wherein the at least one camera includes an objective lens having a main axis and a position sensitive detector. Using the camera, it is possible to record visible light images of the surroundings of the surveying system while measurements are recorded using the measuring light beam and the rotating mirror. The visible light images provide an alternative source of information which can be useful for interpreting the measuring results obtained using the measuring light beam and rotating mirror.

According to further exemplary embodiments, the surveying system comprises first and second cameras mounted on the mounting structure, wherein the main axes of the first and second cameras are oriented in different circumferential directions and/or different azimuthal directions relative to the axis of rotation of the mounting structure relative to the support. Using plural cameras oriented at different angles relative to the mounting structure allows to obtain panoramic images while operating the surveying system to record measurements using the measuring light beam and rotating mirror.

According to further exemplary embodiments, the surveying system comprises an optical instrument, such as a laser pointer and an electronic distance measuring instrument (EDM), mounted on the mounting structure, wherein the optical instrument is configured to direct a beam of light in a direction substantially coinciding with a direction of the light beam reflected from the first mirror when the first mirror is in a predetermined rotational position about the second axis. The mounting structure can be rotated relative to the support to emit the visible light beam in a selected direction for visibly marking a location on an object.

BRIEF DESCRIPTION OF THE DRAWINGS

Embodiments of the invention to be illustrated with reference to the drawing below. Herein:

FIG. 1 is a schematic sectional view of a surveying system.

DETAILED DESCRIPTION

An exemplary surveying system will be illustrated with reference to FIG. 1 below. Herein, FIG. 1 is a simplified sectional view schematically illustrating details of a surveying system. The surveying system 1 comprises a base 3 mounted on a tripod 5, and an alidade 7. The alidade 7 is mounted on the base 3 and can be rotated relative to the base 3 about an axis 9 as indicated by an arrow 10 in FIG. 1. The tripod 5 can be adjusted such that the axis 9 is oriented in the vertical direction when the surveying system 1 is used. A motor 6 is provided to rotate the alidade 7 relative to the base 3. The motor 6 is controlled by a controller 19 mounted within the base 3, or on any other suitable component of the surveying system 1. The surveying system 1 may further comprise a rotational encoder (not shown in FIG. 1) connected to the controller 19 so that the controller 19 can measure the current rotational position of the alidade 7 relative to the base 3.

The surveying system 1 further comprises a measuring unit 11 mounted on a mounting structure 13. The mounting structure 13 is mounted on the alidade 7 and rotatable relative to the alidade 7 about an axis 14 as indicated by an arrow 15 in FIG. 1. The axis 14 is substantially orthogonal to the axis 9 of rotation of the alidade 7 relative to the base 3. A motor 17 is provided to rotate the mounting structure 13 relative to the alidade 7. The motor 17 is controlled by the controller 19. Moreover, the surveying system 1 may comprise a rotational encoder (not shown in FIG. 1) connected to the controller 19 so that the controller 19 can measure the current rotational position of the mounting structure 13 relative to the alidade 7.

The measuring unit 11 comprises a rotating mirror 21 carried by a motor 23 mounted on the mounting structure 13. The motor 23 is controlled by the controller 19 and rotates the rotating mirror 21 about an axis 16 of rotation as indicated by an arrow 18 in FIG. 1. The axis 16 of rotation of the mirror substantially coincides with the axis 14 of rotation of the mounting structure 13 relative to the alidade 7. The rotating mirror 21 has a substantially flat mirror surface 25 having a surface normal oriented at an angle of 45 degrees relative to the axis 16 of rotation of the rotating mirror 21.

The measuring unit 11 further comprises a light source 27, such as a laser source, pulsed laser source and/or a fiber laser, for example. The light source 27 is mounted on the mounting structure 13 and configured to generate light pulses which are supplied to an emitting element 29, such as a collimation lens, via a fiber 31. A thin beam 33 of measuring light is emitted from the emitting element 29, enters a glass prism 35 and is reflected from an internal surface 37 of the prism 35 such that it substantially coincides with the axis 16 of rotation of the rotating mirror 21. The beam 33 of measuring light leaves the prism 35 through a glass plate 39. The glass plate 39 has a mirror surface 41 having a surface normal which can be oriented relative to the axis 16 of rotation of the rotating mirror 21 at an angle of 45 degrees, for example. The mirror surface 41 has a central portion 43 traversed by the beam 33 of measuring light. The central portion 43 may carry an antireflective coating such that a low amount of the measuring light is reflected from the mirror surface 41 while the main portion of the beam 33 of measuring light is incident on the mirror surface 25 at an angle of 45 degrees. When the rotating mirror 21 is oriented as shown in FIG. 1, the beam 33 of measuring light is reflected from the mirror surface 25 such that the thin beam 33 of measuring light is emitted from the surveying system 1 in the vertical direction as indicated by an arrow 45 in FIG. 1. This measuring light will be incident on an object, and a portion of that light is scattered by the object or reflected from the object such that it travels back to the surveying system 1 as a broader beam 46 as indicated by arrows 47 in FIG. 1.

The mounting structure 13 comprises one or more windows 49 allowing the beam 33 of measuring light to leave the measuring unit 11 and to allow the light 47 received back from the object to enter the measuring unit 11. The window 49 can be a single ring-shaped window extending around the axis 18 of rotation of the rotating mirror 21.

The light received back from the object is incident on the mirror surface 25 of the rotating mirror 21, and is reflected from the mirror surface 25 to be incident on the mirror 41. Apart from its central portion 43, the mirror surface 41 carries a reflective coating such that most of the light received back from the object is directed towards a focusing lens 51 concentrating the light received back from the object onto a detector 53. Detection signals produced by the detector 53 are supplied to the controller 19. The controller 19 may measure differences between times when light pulses are generated by the light source 27 and corresponding times when these light pulses are detected by the detector 53. These time differences represent the time of flight of a light pulse from the measuring unit to the object and from the object back to the measuring unit 11. This measured time of flight is indicative of the distance of the object from the surveying system 1.

The controller 19 may control the motor 23 to rotate the mirror 21 about the axis 16. This results in the light beam 45 emitted from the surveying system 1 to rotate about the axis 16 in a plane orthogonal to the axis 16. By operating the motor 6 in order to rotate the alidade 7 about the axis 9, the controller 19 may direct the measuring light beam 45 emitted from the serving system 1 in any direction.

It is apparent that plural factors generate deviations from the ideal situation illustrated above, in which the light beam 45 emitted from the surveying system 1 coincides with a mathematical plane orthogonal to the axis 16 of rotation of the rotating mirror 21. These factors include deviations of the angle of incidence of the measuring light beam 33 on the mirror surface 25 from 45°, displacements of the location of incidence of the beam 33 on the mirror surface 25 from the point where the axis 16 of rotation of the rotating mirror 21 intersects the mirror surface 25, and deviations of the angle between the axis 16 of rotation of the rotating mirror 21 and the axis 14 of rotation of the alidade 7 relative to the base 3 from 90°.

The surveying system 1 comprises a calibration unit 55 configured to determine at least some of these deviations. The calibration unit 55 comprises a position sensitive detector 57 mounted on the base 3 and configured to receive measuring light 45 emitted from the measuring unit 11 at at least some rotational positions of the rotating mirror 21 about the axis 9. For this purpose, the alidade 7 comprises a window 59 transmitting measuring light having traversed the window 49 of the mounting structure 13 when the rotating mirror 21 is in a rotational position opposite to that shown in FIG. 1 such that it reflects the beam 45 of measuring light in the downward direction in FIG. 1.

The support of the alidade 7 on the base 3 is provided by a hollow shaft 61 such that this measuring light is incident on a reflecting surface 63. The light is reflected from this reflecting surface 63 towards a focusing lens 65. The lens 65 focuses the light reflected from the rotating mirror 21 on a detection surface of the detector 57, subsequent to a reflection from a semitransparent surface 67 of a beam splitter 69.

Based on detection signals supplied by the detector 57 to the controller 19, the controller 19 may determine the locations of incidence of the light beam 45 emitted from the measuring unit 11 on the detection surface of the detector 57. This position is indicative of the direction into which the beam 45 of measuring light is emitted from the measuring unit 11 at a given rotational position of the rotating mirror 21 about its axis 16 of rotation. However, this position of incidence of the light on the detector 57 can only be determined for a small range of orientations of the rotating mirror 21 about its axis 16 rotation. In order to expand this range, the controller 19 is configured to operate the motor 17 in order to rotate the mounting structure 13 about the axis 15 relative to the alidade 7. After such rotation, the detector 57 will detect the light emitted from the measuring unit 11 at other rotational positions of the rotating mirror 21 about its axis 16 of rotation. Based on this method, the direction of the emission of the measuring light from the measuring unit 11 can be determined for many or all rotational positions of the rotating mirror 21 about its axis 16 of rotation.

The calibration system 55 further comprises a light source 69 illuminating a pinhole 71. The light emitted from the pinhole 71 traverses the beam splitter 69 and is collimated by the focusing lens 65. According to other examples, this light beam can be generated by a point source LED. The light having traversed the focusing lens 65 is reflected from the mirror 63 and travels in the vertical direction in FIG. 1 and enters the mounting structure 13 through the window 49. A glass plate 73 is arranged in a beam path of this light. The glass plate 73 carries an anti-reflective coating on its main flat surface 74, and a coating having a high reflectivity on its other main flat surface 75. A portion of the light emitted by the light source 69 is reflected from the surface 75 of the glass plate 73 and travels back to the mirror 63, where it is reflected and focused on the detector 57. The controller 19 determines the location of incidence of this light for plural different rotational positions of the alidade 7 relative to the base 3. Thereafter, the mounting structure 13 is rotated about the axis 14 by 180°, such that the glass plate 73 is located at a position indicated with dotted lines in FIG. 1. Also in this position, some of the light emitted by the light source 69 is reflected from the surface 75 of the glass plate 73 such that it is detected by the detector 57. Again, plural measurements are performed for different rotational positions of alidade 7 about the axis 9.

Based on these measurements, it is possible to determine the angle between the axis 9 of rotation of the alidade 7 relative to the base 3 and the axis 14 of rotation of the mounting structure 13 relative to the alidade 7. In particular, it is possible to determine deviations of this angle from 90°. Additional information relating to this method of determination of the angle between the axis of rotation of the alidade relative to the base and the axis of rotation of the mounting structure relative to the alidade can be found in the co-pending patent application of the present applicant titled "SURVEYING INSTRUMENT AND METHOD OF CALIBRATING A SURVEY INSTRUMENT" which is filed on the same day as the present application (attorney reference T13501-EP), wherein the whole disclosure of this patent application is incorporated herein by reference:

According to some examples, the measuring light emitted by the light source 27 has a wavelength different from a wavelength of the light emitted from the light source 69, and the reflective coating on the surface 75 is designed such that it is substantially transparent for the light of the measuring light source 27.

The surveying system 1 further comprises plural cameras 81 mounted on the mounting structure 13. Each camera 81 comprises an objective lens 83 and a position sensitive detector 85 and is configured to record visual images of the surroundings of the surveying system 1. Each camera 81 has a main axis 87 defined by the optical axis of the objective lens 83. The plural cameras 81 differ with respect to the orientations of their main axes 87 relative to the mounting structure 13. The main axes 87 of the plural cameras 81 differ with respect to their orientation in the circumferential direction about the axis 14 and with respect to the azimuthal direction with respect to the axis 14. The cameras 81 can be used to record visual light images of the surroundings of the surveying system simultaneously with the recording of distance measurements using the measuring light beam 45 reflected from the rotating mirror 21, for example.

The measuring unit can be operated in two modes of operation, for example. In a first mode, the first light source 27 emits a continuous train of light pulses at a given frequency such that the light pulses are directed in plural discrete circumferential directions about the axis 16 of rotation of the rotating mirror 21. These circumferential directions depend on the speed and phase of the rotation of the rotating mirror about the axis 16. In a second mode, the first light source 27 is operated such that single pulses of light are triggered at selected times when the rotating mirror 21 is in a given rotational position in order to perform measurements in desired selected directions about the axis 16 of rotation of the mirror 21, wherein the selected directions can be determined independently of the frequency of the light pulses used in in the first mode.

In the above illustrated embodiment, the light source 27 of the measuring unit 11 is mounted on the mounting structure 13 which is rotatable relative to the alidade 7 about the axis 14. According to other embodiments, the light source generating the measuring light for performing measurements, such as distance measurements, is mounted on the alidade 7. In such embodiments, a shaft supporting the mounting structure 13 on the alidade can be formed as a hollow shaft such that the measuring light generated by the light source outside of the mounting structure may enter the mounting structures by traversing the hollow shaft such that it is incident on the mirror surface 25 of the rotating mirror 21 along the axis 16 of rotation of the rotating mirror 21.

In the embodiment illustrated above, the mounting structure is rotatably mounted on the alidade 7 which is again rotatably mounted on the base 3, wherein the base 3 can be mounted on a tripod 5, for example. According to other embodiments, the mounting structure supporting the rotating mirror 21 is rotatably mounted on supports which do not form an alidade which is rotatable relative to a base about an axis substantially orthogonal to the axis of rotation of the rotating mirror. It is, for example possible to mount such support on a vehicle, such as car, a train or an aircraft, such that the axis of rotation of the rotating mirror is aligned with the moving direction of the vehicle. Other orientations relative to the moving direction of the vehicle are possible, as long as the axis of rotation of the rotating mirror is not orthogonal to the moving direction of the vehicle. It is then possible to scan the surroundings of a route, such as a street, a train track or flight path, respectively, along which the vehicle is traveling. It is, for example, possible to record shapes of the walls of a tunnel traversed by the vehicle with high accuracy. In such embodiments, it is advantageous to mount components of the calibration unit in the mounting structure rather than the base for achieving the advantage of being able to determine the directions of emissions of the measuring light for all rotational positions of the rotating mirror about its axis of rotation.

The surveying system 1 may further comprise a laser pointer 91 shown in dotted lines in FIG. 1. The laser pointer 91 is mounted on the mounting structure 13 and configured to emit a beam of visible light indicated by an arrow 93 in FIG. 1. The laser pointer 91 is positioned and oriented relative to the mounting structure 13 such that the beam 93 of visible light coincides with the direction 45 of the measuring light beam 33 reflected from the rotating mirror 21 when the rotating mirror 21 is in a predetermined rotational position about its axis 16 of rotation. When the rotating mirror 21 is in this predetermined rotational position, the laser pointer 91 may block the beam 33 of measuring light but the beam 93 of visible light emitted by the laser pointer 91 extends along a line substantially coinciding with the line along which the beam 33 of measuring light would extend if the laser pointer 91 were not present.

The beam 93 of visible light can be used to mark selected positions on objects such that these positions are visible to a user of the surveying system. For this purpose, the controller 19 may rotate the alidade 7 relative to the base 3 and the mounting structure 13 relative to the alidade 7 until the beam 93 is emitted in a desired direction and illuminates a location on an object. The user may then confirm this location, and the controller may rotate the mounting structure 13 relative to the alidade 7 until the laser pointer 91 no longer blocks the beam 33 of measuring light when it is reflected from the rotating mirror 21 in the direction previously confirmed by the user. A distance measurement may then be performed relative to the confirmed location on the object, for example.

Alternatively or in addition to the laser pointer 91, the surveying system may further comprise some other an optical instrument, such as an electronic distance measuring instrument (EDM), mounted on the mounting structure 13 and configured to direct a beam of measuring light in a direction substantially coinciding with the direction of the light beam 33 reflected from the first mirror 21 when the first mirror 21 is in a predetermined rotational position about the second axis 16. When the additional optical instrument is an electronic distance measuring instrument (EDM), it can be used to perform precision distance measurements in selected directions, for example.

Additional information relating to surveying instruments having rotating mirrors can be found in the co-pending patent application of the present applicant titled "SURVEYING SYSTEM AND ROTATING MIRROR FOR A SURVEYING SYSTEM" which is filed on the same day as the present application (attorney reference T13844-EP), wherein the whole disclosure of this patent application is incorporated herein by reference.

The present application in particular discloses the following combinations of features:

1. A surveying system, comprising: a controller; a support; a mounting structure mounted on the support, wherein the mounting structure is rotatable about a first axis relative to the support; a first motor controlled by the controller and configured to rotate the mounting structure relative to the support; a first mirror mounted on the mounting structure, wherein the first mirror is rotatable relative to the mounting structure about a second axis, wherein the second axis substantially coincides with the first axis; a second motor controlled by the controller and configured to rotate the first mirror relative to the mounting structure; and a first light source configured to direct a light beam onto the first mirror.

2. The surveying system of combination 1, wherein a direction of incidence of the light beam on the first mirror is substantially parallel to the second axis; and/or wherein an angle of intersection of the second axis with a mirror surface of the first mirror is about 45°, and/or wherein the first axis is oriented substantially parallel to the second axis, and or wherein the first axis substantially coincides with the second axis.

3. The surveying system of combinations 1 and 2, further comprising a first detector configured to detect light having traveled a beam path extending from the first light source via the first mirror to an object and back from the object via the first mirror to the first detector.

4. The surveying system of combinations 1 to 3, further comprising a second detector mounted on a component different from the mounting structure, in particular the support or a component to which the support is mounted, and configured to detect light having traveled a beam path extending from the first light source via the first mirror to the second detector.

5. The surveying system of combinations 1 to 4, further comprising a base; wherein the support is mounted on the base; and wherein the support is rotatable relative to the base about a third axis oriented transverse to the first axis.

6. The surveying system of combination 5, wherein the third axis is oriented substantially orthogonal to the first axis.

7. The surveying system of combinations 5 and 6, further comprising a third motor controlled by the controller and configured to rotate the support relative to the base.

8. The surveying system of combinations 5 to 7, further comprising a tripod, wherein the base is mounted on the tripod.

9. The surveying system of combinations 5 to 8, wherein the second detector is mounted on the base.

10. The surveying system combinations 5 to 9, further comprising a second mirror mounted on the mounting structure; a second light source mounted on a component different from the mounting structure, in particular the support or a component to which the support is mounted, and configured to direct a light beam onto the second mirror when the mounting structure is in a predefined first rotational position about the first axis and when the mounting structure is in a predefined second rotational position about the first axis relative to the support; and a third detector mounted on a component different from the mounting structure, in particular the support or a component to which the support is mounted, and configured to detect light having traveled a beam path extending from the second light source via the second mirror to the third detector; and wherein the second rotational position differs from the first rotational position by more than 20°.

11. The surveying system of combination 10, further comprising a beam splitter mounted on the component different from the mounting structure, wherein the beam splitter is provided in a beam path between the second light source and the second mirror when the mounting structure is in one of the first and second rotational positions about the first axis.

12. The surveying system of combinations 10 and 11, further comprising a focusing lens mounted on the base, wherein the focusing lens is provided in a beam path between the second light source and the second mirror when the mounting structure is in one of the first and second rotational positions about the first axis.

13. The surveying system of combinations 10 and 11, further comprising a second mirror mounted on the mounting structure; a third mirror mounted on the base; a second light source mounted on the support and configured to direct a light beam onto the second mirror when the mounting structure is in a predefined first rotational position about the first axis and when the mounting structure is in a predefined second rotational position about the first axis; and a third detector mounted on the base and configured to detect light having traveled a beam path extending from the second light source the third detector, wherein the beam path includes a portion extending between the second mirror and the third mirror; and wherein the second rotational position differs from the first rotational position by more than 20°.

14. The surveying system of combination 13, further comprising a beam splitter mounted on the support, wherein the beam splitter is provided in a beam path between the second light source and the second mirror when the mounting structure is in one of the first and second rotational positions about the first axis.

15. The surveying system of combinations 13 and 14, further comprising a focusing lens mounted on the support, wherein the focusing lens is provided in a beam path between the second light source and the second mirror when the mounting structure is in one of the first and second rotational positions about the first axis.

16. The surveying system of combinations 10 to 15, wherein the third detector is configured to detect light having traveled a beam path extending from the first light source via the first mirror to the second detector.

17. The surveying system of combinations 1 to 16, wherein the controller is configured to determine a value representing an angle between the first axis and the second axis based on detection signals provided by the third detector.

18. The surveying system of one of combinations 1 to 17, wherein the controller is configured to determine a value representing an angle between the third axis and at least one of the first axis and the second axis based on detection signals provided by the third detector.

19. The surveying system of combinations 1 to 18, further comprising at least one camera mounted on the mounting structure, wherein the at least one camera includes an objective lens having a main axis and a position sensitive detector.

20. The surveying system of combinations 19, wherein a first camera and a second camera are mounted on the mounting structure; wherein the main axis of the first camera is oriented in a first circumferential direction about the first axis; wherein the main axis of the second camera is oriented in a second circumferential direction about the first axis; and wherein the first and second circumferential directions differ by more than 20°.

21. The surveying system of combinations 19 and 20, wherein a first camera and a second camera are mounted on the mounting structure; wherein the main axis of the first camera is oriented in a first azimuthal direction with respect to the first axis; wherein the main axis of the second camera is oriented in a second azimuthal direction with respect to the first axis; and wherein the first and second azimuthal directions differ by more than 20°.

22. The surveying system of combinations 1 to 21, further comprising an optical instrument, such as a laser pointer and an electronic distance measuring instrument (EDM), mounted on the mounting structure, wherein the optical instrument is configured to direct a beam of light in a direction substantially coinciding with a direction of the light beam reflected from the first mirror when the first mirror is in a predetermined rotational position about the second axis.

Some embodiments have been described in connection with the accompanying drawing. However, it should be understood that the FIGURE is not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A surveying system, comprising:
a controller;
a support;
a mounting structure mounted on the support, wherein the mounting structure is rotatable about a first axis relative to the support;
a first motor controlled by the controller and configured to rotate the mounting structure relative to the support;
a first mirror mounted on the mounting structure, wherein the first mirror is rotatable relative to the mounting structure about a second axis, wherein the second axis substantially coincides with the first axis, and wherein the first axis is oriented substantially parallel to the second axis;
a second motor controlled by the controller and configured to rotate the first mirror relative to the mounting structure; and
a first light source configured to direct a light beam onto the first mirror.

2. The surveying system of claim 1, further comprising:
a first detector configured to detect light having traveled a beam path extending from the first light source via the first mirror to an object and back from the object via the first mirror to the first detector.

3. The surveying system of claim 1, further comprising:
a second detector mounted on a component different from the mounting structure, in particular the support or a component to which the support is mounted, and configured to detect light having traveled a beam path extending from the first light source via the first mirror to the second detector.

4. The surveying system of claim 1, further comprising:
a base;
wherein the support is mounted on the base;
wherein the support is rotatable relative to the base about a third axis oriented transverse to the first axis; and
wherein the third axis is oriented substantially orthogonal to the first axis.

5. The surveying system of claim 4, further comprising:
a third motor controlled by the controller and configured to rotate the support relative to the base; and
a tripod, wherein the base is mounted on the tripod.

6. The surveying system of claim 4,
wherein a second detector is mounted on the base.

7. The surveying system of claim 1, further comprising:
a second mirror mounted on the mounting structure;
a second light source mounted on a component different from the mounting structure, in particular the support or a component to which the support is mounted, and configured to direct a light beam onto the second mirror when the mounting structure is in a predefined first rotational position about the first axis and when the mounting structure is in a predefined second rotational position about the first axis relative to the support; and
a third detector mounted on a component different from the mounting structure, in particular the support or a component to which the support is mounted, and configured to detect light having traveled a beam path extending from the second light source via the second mirror to the third detector; and
wherein the second rotational position differs from the first rotational position by more than 20°.

8. The surveying system of claim 7, further comprising:
a beam splitter mounted on the component different from the mounting structure,
wherein the beam splitter is provided in a beam path between the second light source and the second mirror when the mounting structure is in one of the first and second rotational positions about the first axis.

9. The surveying system of claim 7, further comprising:
a focusing lens mounted on a base,
wherein the focusing lens is provided in a beam path between the second light source and the second mirror when the mounting structure is in one of the first and second rotational positions about the first axis.

10. The surveying system of claim 7,
wherein the third detector is configured to detect light having traveled a beam path extending from the first light source via the first mirror to the third detector.

11. The surveying system of claim 1,
wherein the controller is configured to determine a value representing an angle between the first axis and the second axis based on detection signals provided by a third detector; and/or
wherein the controller is configured to determine a value representing an angle between a third axis and at least one of the first axis and the second axis based on detection signals provided by the third detector.

12. The surveying system of claim 1, further comprising:
at least one camera mounted on the mounting structure,
wherein the at least one camera includes an objective lens having a main axis and a position sensitive detector.

13. The surveying system of claim 12,
wherein the at least one camera comprises a first camera and a second camera mounted on the mounting structure;
wherein the main axis of the first camera is oriented in a first circumferential direction about the first axis;
wherein the main axis of the second camera is oriented in a second circumferential direction about the first axis; and
wherein the first and second circumferential directions differ by more than 20°.

14. The surveying system of claim 12,
wherein the at least one camera comprises a first camera and a second camera mounted on the mounting structure;
wherein the main axis of the first camera is oriented in a first azimuthal direction with respect to the first axis;
wherein the main axis of the second camera is oriented in a second azimuthal direction with respect to the first axis; and
wherein the first and second azimuthal directions differ by more than 20°.

15. The surveying system of claim 1, further comprising:
an optical instrument, in particular including a laser pointer and an electronic distance measuring instrument (EDM), mounted on the mounting structure,
wherein the optical instrument is configured to direct a beam of light in a direction substantially coinciding with a direction of the light beam reflected from the first mirror when the first mirror is in a predetermined rotational position about the second axis.

16. The surveying system of claim 1,
wherein a direction of incidence of the light beam on the first mirror is substantially parallel to the second axis; and/or
wherein an angle of intersection of the second axis with a mirror surface of the first mirror is about 45°.

17. The surveying system of claim 1, further comprising:
a second mirror mounted on the mounting structure;
a third mirror mounted on a base;

a second light source mounted on the support and configured to direct a light beam onto the second mirror when the mounting structure is in a predefined first rotational position about the first axis and when the mounting structure is in a predefined second rotational position about the first axis; and a third detector mounted on the base and configured to detect light having traveled a beam path extending from the second light source the third detector;

wherein the beam path includes a portion extending between the second mirror and the third mirror; and wherein the second rotational position differs from the first rotational position by more than 20°.

18. The surveying system of claim 17, further comprising:
a beam splitter mounted on the support;
wherein the beam splitter is provided in a beam path between the second light source and the second mirror when the mounting structure is in one of the first and second rotational positions about the first axis.

19. The surveying system of claim 17, further comprising:
a focusing lens mounted on the support;
wherein the focusing lens is provided in a beam path between the second light source and the second mirror when the mounting structure is in one of the first and second rotational positions about the first axis.

20. A surveying system, comprising:
a controller;
a support;
a mounting structure mounted on the support, wherein the mounting structure is rotatable about a first axis relative to the support;
a first motor controlled by the controller and configured to rotate the mounting structure relative to the support;
a first mirror mounted on the mounting structure, wherein the first mirror is rotatable relative to the mounting structure about a second axis, wherein an angle of intersection of the second axis with a mirror surface of the first mirror is about 45°, and wherein the second axis substantially coincides with the first axis;
a second motor controlled by the controller and configured to rotate the first mirror relative to the mounting structure; and
a first light source configured to direct a light beam onto the first mirror.

* * * * *